US008417745B2

(12) United States Patent
Armes et al.

(10) Patent No.: US 8,417,745 B2
(45) Date of Patent: Apr. 9, 2013

(54) SYSTEM AND METHOD FOR FILE SERVICES

(75) Inventors: David Armes, Phoenix, AZ (US); Rene Koutia, Glendale, AZ (US); Diana M. LaFoley, Cave Creek, AZ (US)

(73) Assignee: American Express Travel Related Services Company, Inc., New York, NY (US)

( * ) Notice: Subject to any disclaimer, the term of this patent is extended or adjusted under 35 U.S.C. 154(b) by 838 days.

(21) Appl. No.: 10/709,295

(22) Filed: Apr. 27, 2004

(65) Prior Publication Data

US 2005/0240550 A1    Oct. 27, 2005

(51) Int. Cl.
*G06F 12/00* (2006.01)
(52) U.S. Cl. .................. 707/821; 707/999.203; 715/748
(58) Field of Classification Search .................. 707/205, 707/821, 999.203; 709/237; 715/748
See application file for complete search history.

(56) References Cited

U.S. PATENT DOCUMENTS

| | | | | |
|---|---|---|---|---|
| 4,642,758 A | * | 2/1987 | Teng ........................................ | 1/1 |
| 5,915,252 A | * | 6/1999 | Misheski et al. .......... | 707/103 R |
| 6,061,733 A | * | 5/2000 | Bodin et al. .................. | 709/233 |
| 6,185,623 B1 | * | 2/2001 | Bailey et al. .................. | 709/238 |
| 6,965,569 B1 | * | 11/2005 | Carolan et al. ................ | 370/238 |
| 2001/0039594 A1 | * | 11/2001 | Park et al. ..................... | 709/311 |
| 2002/0049853 A1 | * | 4/2002 | Chu et al. ....................... | 709/237 |
| 2003/0041095 A1 | * | 2/2003 | Konda et al. .................. | 709/201 |
| 2005/0027865 A1 | * | 2/2005 | Bozak et al. .................. | 709/226 |
| 2005/0132325 A1 | * | 6/2005 | Unbehagen .................. | 717/103 |

OTHER PUBLICATIONS

Microsoft Pres, Computer Dictionary 3rd Edition, p. 107.*
Microsoft Pres, Computer Dictionary 3rd Edition, pp. 118, 119, and 137.*
International Seaiching Authority/US, International Search Report, Jul. 20, 2007.
International Searching Authority/US, Written Opinion of the International Searching Authority, Jul. 20, 2007.
International Bureau of WIPO, International Preliminary Report on Patentability, Aug. 7, 2007.

* cited by examiner

*Primary Examiner* — Cheyne Ly
(74) *Attorney, Agent, or Firm* — Snell & Wilmer L.L.P.

(57) ABSTRACT

The invention integrates multiple software products and functional components to facilitate file and message delivery, along with managing, tracking and moving bulk data. The packaged system may incorporate user-defined value added services to transported data including, for example, user authentication, access authorization, encryption and compression.

20 Claims, 2 Drawing Sheets

SYSTEM AND METHOD FOR FILE SERVICES

FIELD OF INVENTION

The present invention generally relates to file movement systems, and more particularly, to a system and method for combining electronic file movement service components.

BACKGROUND OF INVENTION

As physical file systems are becoming increasingly cost prohibitive, many enterprises currently use electronic file management as their preferred data maintenance system. However, new challenges exist with efficiently and securely moving electronic data files. For example, challenges exist with securing file content during wire and wireless transmission because, as files are moved electronically, the possibility of eavesdroppers and line tapping increases. To minimize these concerns, security experts developed encryption, decryption, and file compression software, which resulted in the need for companies to obtain new software. Moreover, additional software needed to be developed for proper routing, ownership tracking, and permissible access of electronic files. Accordingly, a long felt need exists in the electronic file industry for a comprehensive system for securely and efficiently moving files electronically.

Furthermore, as enterprises were forced to deal with each new file transmission challenge, software was subsequently developed or acquired to solve each new problem. As such, file service functionality has often been created or pieced together for each particular file transmission development or improvement. Due in part to the gradual development, file service interfaces and cross-functionalities are not optimal. Accordingly, a need exists for a complete, packaged utility that meets generic file service needs from end-to-end, builds file service needs over and over again based on changing enterprise demands and includes an adaptable, scalable, generic architecture that supports file services.

SUMMARY OF INVENTION

The invention includes a comprehensive, generic, enterprise solution which facilitates file and message delivery, along with managing, tracking and moving bulk data, through the integration of multiple software products and functional components. The packaged system may incorporate user-defined value added services to the transported data including, for example, user authentication, access authorization, encryption and compression.

The invention may include at least one of the following functional components which may include various subcomponents. The File Transfer Services component transmits or receives a file on request and may interact with centralized file management hub components for file routing and tracking information. The File Routing and Workflow component may route the file through a network and provide the routing information to File Transfer nodes to route/schedule the file transfer to various destinations using the supported file transfer methods. The File Transformation component may apply an enterprise's logic to transform or validate file content, wherein a transformation map may be defined (e.g., inputs, outputs, validation rules, etc.) and may attach to the file. The Tracking and Monitoring component may provide end-to-end tracking of a file and role based multi layered tracking information of a file. The Parameter and Configuration Management component is a centralized component that may be a gateway to store/retrieve configuration information such as, for example, an enterprise's access control to the system, file transfer routing information, file retention information, and communication channel parameter information through a network (e.g., Internet or Intranet).

BRIEF DESCRIPTION OF DRAWINGS

A more complete understanding of the present invention may be derived by referring to the detailed description and claims when considered in connection with the Figures, where like reference numbers refer to similar elements throughout the Figures, and:

DETAILED DESCRIPTION

The detailed description of exemplary embodiments of the invention herein makes reference to the accompanying Figures, which depict the exemplary embodiment by way of illustration and its best mode. While these exemplary embodiments are described in sufficient detail to enable those skilled in the art to practice the invention, it should be understood that other embodiments may be realized and that logical and mechanical changes may be made without departing from the spirit and scope of the invention. Thus, the detailed description herein is presented for purposes of illustration only and not of limitation. For example, the steps recited in any of the method or process descriptions may be executed in any order and are not limited to the order presented and/or other steps may be added or omitted while still attaining the same or a similar result. For the sake of brevity, certain sub-components of the individual operating components, conventional data networking, application development and other functional aspects of the systems may not be described in detail herein. Furthermore, the connecting lines depicted in the various Figures contained herein are intended to represent exemplary functional relationships, interfaces and/or physical couplings between the various elements. It should be noted that many alternative or additional functional relationships or physical connections might be present in a practical system.

For the sake of brevity, conventional data networking, application development and other functional aspects of the systems (and components of the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in a practical system.

As used herein, "enterprise" includes any user or beneficiary of the present invention such as, for example, an individual, an employee, a group, entity, organization, charity, business (e.g., corporation, a partnership, conglomerate), software, hardware and/or the like. As used herein, a "user" may include any person utilizing entry points into the system, wherein the user may act on behalf of a host and may be employed or contracted to implement the present invention for the benefit of a host. The user may be an individual, group, employee, enterprise, contractor, software and/or hardware.

Figure 1:
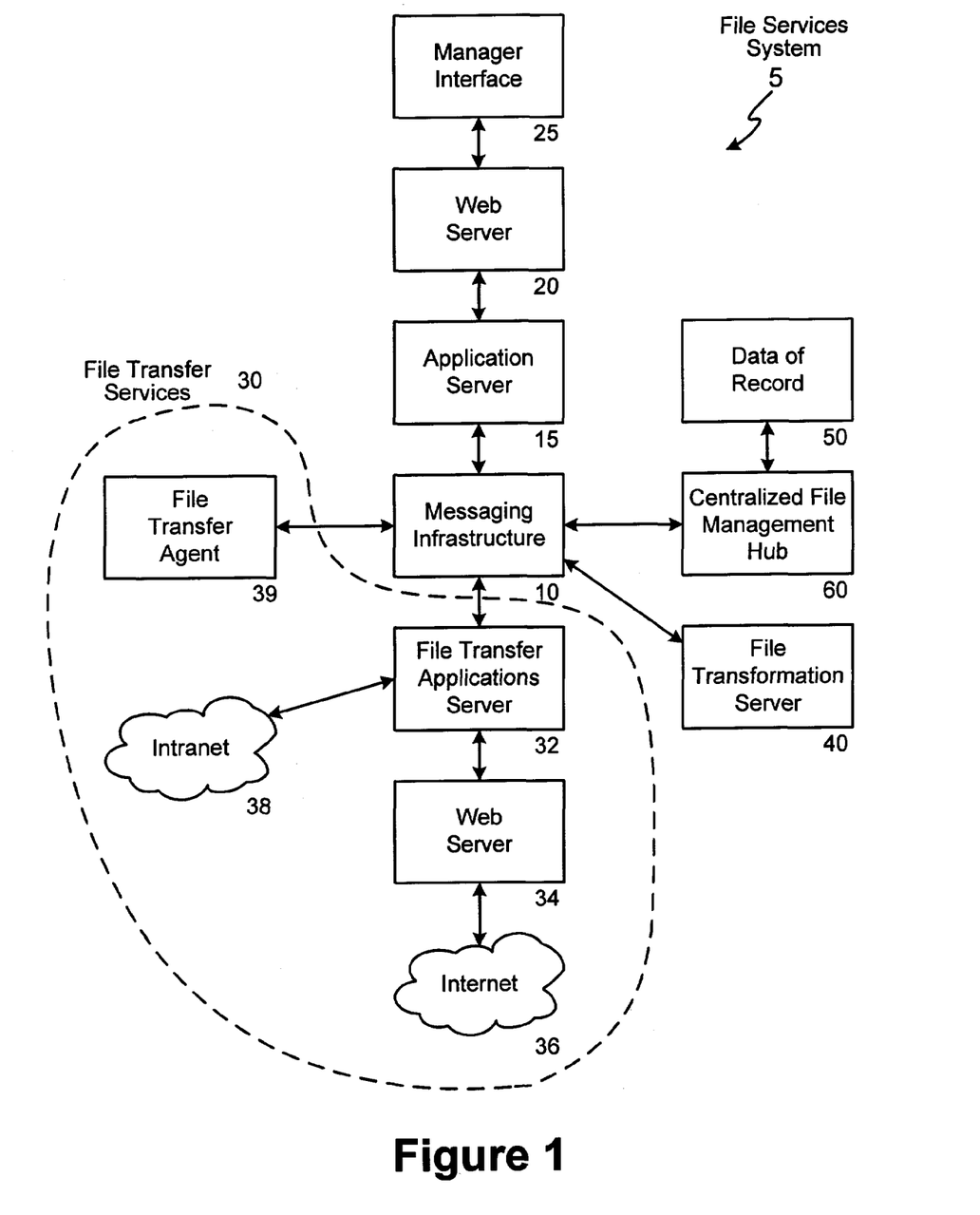
FIG. 1 illustrates a block diagram of an exemplary File Services System in accordance with the present invention; and, FIG. 2 illustrates a block diagram of an exemplary centralized file management hub system in accordance with the present invention.

In an exemplary embodiment and with reference to FIG. 1, File services system 5 may include one or more functional components wherein each functional component may include any suitable hardware and/or software configured to perform the respective functions discussed herein. The functional components may be integrated using a common, open Messaging Infrastructure 10 and the components may be divided or sub-divided over a number of potentially geographically dispersed servers. The various system components discussed herein may include one or more of the following: a host server or other computing systems including a processor for processing digital data; a memory coupled to said processor for storing digital data; an input digitizer coupled to the processor for inputting digital data; an application program stored in said memory and accessible by said processor for directing processing of digital data by said processor; a display device coupled to the processor and memory for displaying information derived from digital data processed by said processor; and a plurality of databases. As those skilled in the art will appreciate, user computer may include an operating system (e.g., Windows NT, 95/98/2000, OS2, UNIX, Linux, Solaris, MacOS, etc.) as well as various conventional support software and drivers typically associated with computers.

Figure 2:
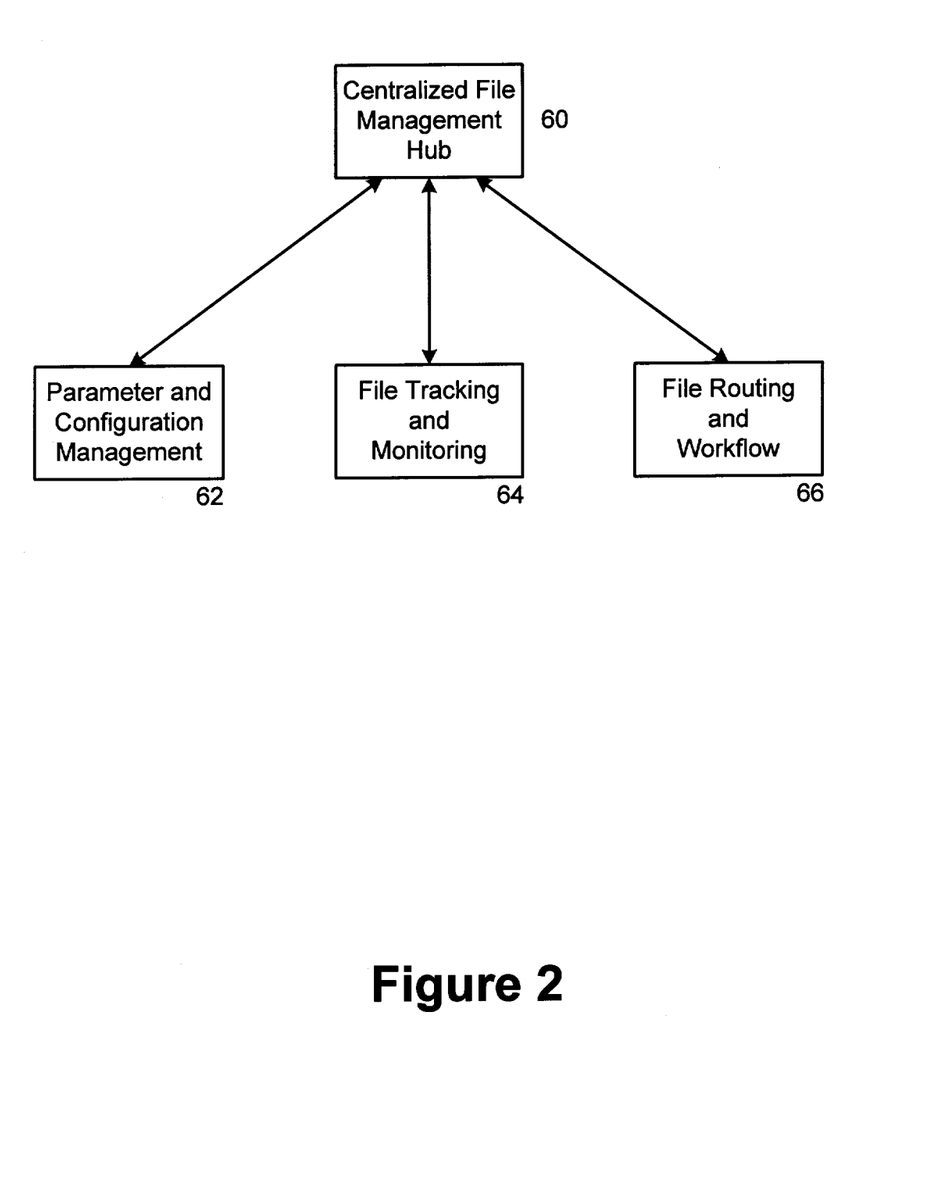

In general, the functional components may include, for example, File Transfer Services 30, a File Transformation component 40, Data of Record 50, Centralized File Management Hub 60, along with application server 15, web server 20 and parameter manager interface device 25. As shown in FIG. 2, the Centralized File Management Hub 60 may include, for example, a Parameter and Configuration Management System 62, a Tracking and Monitoring System 64 and a File Routing and Workflow System 66. Centralized services may also include the database of records 50. The communication within File services system 5 components may utilize a single, common messaging schema for notification messages, logging information, receiving configuration parameters and for initiating workflows. Industry standard messaging schemas may include, for example, SOAP, XML, and the like. In one embodiment, the large files and bulk data may be transmitted from File Transfer Services 30 to File Transformation component 40 (and vice versa), or simply from File Transfer Service 30 to another File Transfer Service 30 for delivery. Regarding large files or bulk data, one skilled in the art will appreciate that file sizes have increased exponentially over recent years due in part to, for example, the increased network bandwidth, hardware processing capability, and disk storage capacity. As such, file sizes may approach 15 Gigabytes, however, the present invention contemplates files of any size, now used or developed in the future. The bulk data may be minimally transported to preserve network bandwidth and may be transported using a suitable file transport protocol. Suitable file transport protocols may include, for example, HTTP/S (HyperText Transport Protocol—Secure), FTP (File Transfer Protocol), and the like.

The user entry points may include any communication hardware and/or software. In an exemplary embodiment, access is through a network or the Internet through a commercially available web-browser software package. As used herein, the term "network" may include any electronic communications system. Communication among the components, enterprise, controller and/or user in accordance with the present invention may be accomplished through any suitable communication channels, such as, for example, a telephone network, an extranet, an intranet, Internet, point of interaction device (point of sale device, personal digital assistant, cellular phone, kiosk, etc.), online communications, off-line communications, wireless communications, transponder communications, local area network (LAN), wide area network (WAN), networked or linked devices and/or the like. Moreover, although the invention is frequently described herein as being implemented with TCP/IP communications protocols, the invention may also be implemented using IPX, Appletalk, IP-6, NetBIOS, OSI or any number of existing or future protocols. If the network is in the nature of a public network, such as the Internet, it may be advantageous to presume the network to be insecure and open to eavesdroppers. Specific information related to the protocols, standards, and application software utilized in connection with the Internet is generally known to those skilled in the art and, as such, need not be detailed herein. See, for example, Dilip Naik, "Internet Standards and Protocols" (1998); "Java 2 Complete", various authors, (Sybex 1999); Deborah Ray and Eric Ray, "Mastering HTML 4.0" (1997); and Loshin, "TCP/IP Clearly Explained" (1997) and David Gourley and Brian Totty, "HTTP, The Definitive Guide" (2002), the contents of which are hereby incorporated by reference.

The various system components may be independently, separately or collectively suitably coupled to the network via data links which includes, for example, a connection to an Internet Service Provider (ISP) over the local loop as is typically used in connection with standard modem communication, cable modem, Dish networks, ISDN, Digital Subscriber Line (DSL), or various wireless communication methods, see e.g., Gilbert Held, "Understanding Data Communications" (1996), hereby incorporated by reference. It is noted that the network may be implemented as other types of networks, such as an interactive television (ITV) network. Moreover, the system contemplates the use, sale or distribution of any goods, services or information over any network having similar functionality described herein.

The computers discussed herein may provide a suitable website or other Internet-based graphical user interface which is accessible by users. In one embodiment, the Microsoft Internet Information Server (IIS), Microsoft Transaction Server (MTS), and Microsoft SQL Server, are used in conjunction with the Microsoft operating system, Microsoft NT web server software, a Microsoft SQL Server database system, and a Microsoft Commerce Server. Additionally, components such as Access or Microsoft SQL Server, Oracle, Sybase, Informix MySQL, Interbase, etc., may be used to provide an Active Data Object (ADO) compliant database management system.

Any of the communications, inputs, storage, databases or displays discussed herein may be facilitated through a website having web pages. The term "web page" as it is used herein is not meant to limit the type of documents and applications that might be used to interact with the user. For example, a typical website might include, in addition to standard HTML documents, various forms, Java applets, JavaScript, active server pages (ASP), common gateway interface scripts (CGI), extensible markup language (XML), dynamic HTML, cascading style sheets (CSS), helper applications, plug-ins, and the like. A server may include a web service that receives a request from a web server, the request including a URL and an IP address. The web server retrieves the appropriate web pages and sends the data or applications for the web pages to the IP address. Web services are applications that are capable of interacting with other applications over a communications means, such as the internet. Web services are typically based on standards or protocols such as XML, SOAP, WSDL and UDDI. Web services methods are well known in the art, and are covered in many standard texts. See, e.g., Alex Nghiem, "IT Web Services: A Roadmap for the Enterprise" (2003), hereby incorporated herein by reference.

File Transfer Services 30 may include any suitable hardware and/or software suitably configured to transfer or receive files and to include multiple different vendor products to support a range of file transport and messaging protocols thereby providing flexibility in the method of communicating to the enterprise. In one embodiment, File Transfer Services 30 includes, one or more File Transfer Agent 39, one or more File Transfer Application Server 32, along with one or more web server 34 that interfaces with Internet 36 and/or intranet 38. File Transfer Agent 39 may include different types of file transfer agents and File Transfer Agent 39 may include one or more of each type of transfer agent. Continuing with reference to FIG. 1, File Transfer Services 30 may also be configured to include user entry points into the File services system 5 such as, for example, Intranet 38 or Internet 36. Intranet 38 may interface with a File Transfer Application Server 32, and Internet 36 may interface with a Web Server 34 that in turn may also interface with a File Transfer Application Server 32. File Transfer Application Server 32 may interface with Messaging Infrastructure 10. File Transfer Services 30 may include a File Transfer Agent 39 that may interface with Messaging Infrastructure 10.

In an exemplary embodiment, File Transfer Services 30, under the direction of File Transfer Agent 39, may interact via Messaging Infrastructure 10 with other File service 5 components. For example, File Transfer Agent 39 may transmit or receive files on request through user entry points (e.g., Intranet 38 or Internet 36) and interact with Centralized File Management Hub 60 for file routing and tracking information. File routing and tracking information may be completed by Centralized File Management Hub 60 that may use Messaging Infrastructure 10 to send requests to distributed components (i.e., File Transfer Agents) to perform workflow tasks. Distributed components, such as File Transfer Agents, may use Messaging Infrastructure 10 to notify Centralized File Management Hub 60 of workflow events (e.g. file transfer, file transformation, processing exceptions, etc).

Messaging Infrastructure 10 may include any hardware and/or software suitably configured to interface with the various components of File Services System 5. Messaging Infrastructure 10 may also facilitate interfaces such as, for example, service requests and responses, which may transmit between both internal File Services System 5 components and external components. Messaging Infrastructure 10 facilitates the workflow management of files through File Services System 5.

Application Server 15 is any hardware and/or software suitably configured to interface with Web Server 20 and Messaging Infrastructure 10. Clients (which may include both individual users and external systems) connect over internal and external network connections to Web server 20. Web server 20 then routes requests to Application Server 15. Application Server 15 may transform web requests into File Service System 5 requests and route the requests over Messaging Infrastructure 10 to Centralized File Management Hub 60.

Manager interface 25 is any hardware and/or software suitably configured to interface with File Services System 5 via web server 20 and application server 15 or via any other network or communication system discussed herein. In one embodiment, manager interface 25 facilitates a controller inserting configuration information and/or viewing tracking information. Examples of configuration information may include the client authentication information, the roles defined for the client's that indicate which activities the client is authorized to perform, the file workflow configuration which may include how the files are routed through the File Services System 5 components and what services will be requested of each component. Examples of tracking information may include the outcome of a workflow task. More specifically, once a file services workflow task begins, significant events are noted along with data and statistics related to these events. These workflow events are maintained in a tracking repository for internal and external, business and technical constituents with varying roles and access rights to view. Manager attempts to ensure that the parameters are sent to the necessary File Services System 5 components upon receipt of data, and in time for execution. Receipt of data generally refers to the bulk package (i.e., file) of business data upon which a File Service System 5 component is to perform a service. The parameters may refer to the service parameters, which service to perform and necessary information to perform the service.

File Transformation component 40 is any hardware and/or software suitably configured to use enterprise logic to reformat, validate and/or enrich the data flowing through File services system 5. Enterprise logic may include the business rules that are applied to the data content. For example, specific field content within a file may specify a value and the business may have rules in place about what field values are considered acceptable.

Reformatting the data may include, for example, arranging data within a file in a format that is convenient to the client or in a format that is a standard in the client's industry. The destination application that will receive this data may not recognize the initial representation of the data; therefore, that data is rearranged in a format the destination can recognize and process. This may be needed as data flows between recently developed systems where data is represented in formats such as XML and legacy systems, wherein data is organized in fixed record representations. Validating data may include, for example, ensuring that the data includes syntactical integrity as received from the client. Enriching the data includes, for example, data provided by the client that may be incomplete, and as such, File Transformation component 40 provides supplemental information in order for the data to be properly processed by the destination system. File Transformation component 40 functions may be based on a set of configurable and adaptable business rules. File Transformation component 40 may define a transformation map and apply the map to the file.

The transformation map may include, for example, inputs, outputs and validation rules. Inputs and Outputs to the transformation map may include bulk data (files) or messages. For example, a transformation map may split a file into several other files to be routed to other File Services System 5 components. It may also be segmented into messages that can be routed to an interactive messaging application. In addition, the transformation map may be a consolidation of files with many files as input and a single file as output. Validation rules may include, for example, business rules that are applied to specific fields within a file to determine whether the content of the file is valid. In one embodiment, File Transformation 40 components and functions may be distributed to preserve network bandwidth and to provide powerful processing for large file transformations near the point of presence for File Transfer Services 5. Near the point of presence may include, for example, the proximity region within the same network segment. If a client sends a large file to a specific regional File Transfer Agent and the end destination of this file is within this region, the intent is to not transmit this data over the network to another region to be transformed and then retransmitted back to the region thereby wasting network resources. Rather, the system includes a File Transformation component physically close to the File Transfer Agent to make use of high-speed connections available when components are locally networked.

Centralized File Management Hub 60 may include any hardware and/or software suitably configured to interface with Messaging Infrastructure 10 and include other components such as, for example, Parameter and Configuration Management 62, Tracking and Monitoring component 64, and File Routing and Workflow component 66. Centralized File Management Hub 60 may also interface with Data of Record 50.

Parameter and Configuration Management component 62 may include any hardware and/or software suitably configured to store parameter and configuration information used for the File Services System 5. Examples of parameter and configuration information may include, the client authentication information, the roles defined for each client that indicates what activities the client is authorized to perform, the file transfer protocol and device configuration, the file workflow configuration that may include how the files are routed through the File Services System 5 components and what services will be requested of each File Services System 5 component. As discussed above, the parameter and configuration information may be received from the Manager via Manager interface 25. In one embodiment, the Parameter and Configuration Management component 62 is a centralized component that may be a gateway to store/retrieve parameter and configuration information such as, for example, an enterprise's access control to the system, file transfer routing information, file retention information, and communication channel parameter information through a network (e.g., Internet or Intranet). The information stored in this repository may affect the execution of the File Services System 5, the access and functionality available to individual users, and the services to apply to each set of data received. Also, parameter and configuration information may affect the types of files a client may send or receive, how long these files may reside within the system, how the client may send or receive files, what workflow path a file may follow through the file services components, the type of validation, the type of transformation that may be applied to the data, and the like.

File Tracking and Monitoring component 64 is any hardware and/or software suitably configured to track a file, provide the status of particular workflow and/or to report on the health of the overall file system. Each File Services System component 5 may report file workflow events via a prescribed messaging infrastructure to File Tracking and Monitoring component 64. File Tracking and Monitoring component 64 may record these events within a tracking repository (not shown). File Tracking and Monitoring component 64 may also proactively generate alerts based on configurable thresholds and events. For example, within Parameter and Configuration Management component 62, alerts, errors or event thresholds may be defined on a client-by-client basis. Also, File Tracking and Monitoring component 64 may be configured to alert if a client attempts to perform an unauthorized task over a defined period of time and a number of occurrences over a defined threshold. In another embodiment, if an event was expected to occur within a defined time period, but it failed to occur, File Tracking and Monitoring component 64 may perform an alert, if appropriately configured. File service 100 components may communicate with File Tracking and Monitoring component 64 using open messaging schema via Messaging Infrastructure 10. A manager may input open messaging schema using standard messaging protocols (e.g., SOAP, XML) into File Tracking and Monitoring component 64 via Manager interface 25. File Tracking and Monitoring component 64 may control access to the audit data through roles-based, access hierarchy. A user may have many roles (i.e., technical support, external client) and these roles may also be segmented by business entities and/or regionally. These roles may define what information the user can access, and how the user accesses the information. Users may access the data from the File Tracking and Monitoring component 64 through the web server which allows for customizable views of the information based on the user's role and access permissions, thereby allowing for role based multilayer tracking information of a file. For example, a network support user may need to only view information at the network protocol level (i.e., number of bytes within a data packet, transmission errors); a business support user may be more interested in content and how a business rule is applied to a specific file; or, a client user may be restricted to viewing only the data that either originated from their system or is destined to be sent to their system.

This roles-based access may facilitate a user obtaining and servicing the status of a particular workflow. For example, each workflow may be comprised of tasks performed by File Services System component 5. The status or outcome of each task is reported by the File Services System component 5 performing the task. The next task in the workflow may be dependent on the outcome of the previous task. The status of what path the workflow is currently taking or completed is maintained within File Tracking and Monitoring component 64. Self-servicing by users allows them to view status information, maintain configuration, and address exceptions as they occur. Such self-servicing is facilitated by the roles-based access that may restrict what self-servicing a user can perform and to which defined workflows a user is authorized to view or maintain.

File Routing and Workflow component 66 includes any hardware and/or software suitably configured to act as the decision center for each bulk data exchange instance. In one embodiment, File Routing and Workflow component 66 may facilitate routing or scheduling file transfers to various destinations using any supported protocol or method. Primary and alternate routes and schedules directed by File Routing and Workflow component 66 may be defined within Parameter and Configuration Management component 62. In one example of a workflow, a file may take alternate routes and schedules depending on factors such as system availability and load balancing constraints. File Routing and Workflow component 66 may also provide mailbox capabilities allowing users to retrieve their data. File Routing and Workflow component 66 may also request that value added services, such as file transformation or validation, be performed on the data. A file's workflow may be defined within Parameter and Configuration Management component 62 and may direct workflow routes which are dependent on the outcome of previous workflow tasks and/or the availability of File Services System components 5 for subsequent workflow tasks. Value-added services (e.g., services in addition to file routing) may be configured as part of the file's workflow.

File Routing and Workflow component 66 may also determine what services are needed on a specific set of data (based on configured setup information) such that the outcome of each of the services may dictate the next step within the workflow. File Routing and Workflow component 66 may also be aware of multiple delivery paths to destinations and may facilitate routing based upon the availability of those delivery paths, thereby providing a more robust file delivery system. In one embodiment, File Routing and Workflow component 66 may route the file through a network and provide the routing information to File Transfer nodes to route/schedule the file transfer to various destinations using the supported file transfer methods.

Data of Record database 50 includes any hardware and/or software suitably configured to store file service records. In one embodiment, Data of Record database 50 interfaces with Centralized File Management Hub 60. Any databases discussed herein may be any type of database, such as relational, hierarchical, graphical, object-oriented, and/or other database configurations. Common database products that may be used to implement the databases include DB2 by IBM (White Plains, N.Y.), various database products available from Oracle Corporation (Redwood Shores, Calif.), Microsoft Access or Microsoft SQL Server by Microsoft Corporation (Redmond, Wash.), or any other suitable database product. Moreover, the databases may be organized in any suitable manner, for example, as data tables or lookup tables. Each record may be a single file, a series of files, a linked series of data fields or any other data structure. Association of certain data may be accomplished through any desired data association technique such as those known or practiced in the art. For example, the association may be accomplished either manually or automatically. Automatic association techniques may include, for example, a database search, a database merge, GREP, AGREP, SQL, and/or the like. The association step may be accomplished by a database merge function, for example, using a "key field" in pre-selected databases or data sectors.

More particularly, a "key field" partitions the database according to the high-level class of objects defined by the key field. For example, certain types of data may be designated as a key field in a plurality of related data tables and the data tables may then be linked on the basis of the type of data in the key field. The data corresponding to the key field in each of the linked data tables is preferably the same or of the same type. However, data tables having similar, though not identical, data in the key fields may also be linked by using AGREP, for example. In accordance with one aspect of the present invention, any suitable data storage technique may be utilized to store data without a standard format. Data sets may be stored using any suitable technique, including, for example, storing individual files using an ISO/IEC 7816-4 file structure; implementing a domain whereby a dedicated file is selected that exposes one or more elementary files containing one or more data sets; using data sets stored in individual files using a hierarchical filing system; data sets stored as records in a single file (including compression, SQL accessible, hashed via one or more keys, numeric, alphabetical by first tuple, etc.); block of binary (BLOB); stored as ungrouped data elements encoded using ISO/IEC 7816-6 data elements; stored as ungrouped data elements encoded using ISO/IEC Abstract Syntax Notation (ASN.1) as in ISO/IEC 8824 and 8825; and/or other proprietary techniques that may include fractal compression methods, image compression methods, etc.

In one exemplary embodiment, the ability to store a wide variety of information in different formats is facilitated by storing the information as a Block of Binary (BLOB). Thus, any binary information can be stored in a storage space associated with a data set. As discussed above, the binary information may be stored on the financial transaction instrument or external to but affiliated with the financial transaction instrument. The BLOB method may store data sets as ungrouped data elements formatted as a block of binary via a fixed memory offset using either fixed storage allocation, circular queue techniques, or best practices with respect to memory management (e.g., paged memory, least recently used, etc.). By using BLOB methods, the ability to store various data sets that have different formats facilitates the storage of data associated with the financial transaction instrument by multiple and unrelated owners of the data sets. For example, a first data set which may be stored may be provided by a first party, a second data set which may be stored may be provided by an unrelated second party, and yet a third data set which may be stored, may be provided by an third party unrelated to the first and second party. Each of these three exemplary data sets may contain different information that is stored using different data storage formats and/or techniques. Further, each data set may contain subsets of data that also may be distinct from other subsets.

As stated above, in various embodiments of the present invention, the data can be stored without regard to a common format. However, in one exemplary embodiment of the present invention, the data set (e.g., BLOB) may be annotated in a standard manner when provided for manipulating the data onto the financial transaction instrument. The annotation may comprise a short header, trailer, or other appropriate indicator related to each data set that is configured to convey information useful in managing the various data sets. For example, the annotation may be called a "condition header", "header", "trailer", or "status", herein, and may comprise an indication of the status of the data set or may include an identifier correlated to a specific issuer or owner of the data. In one example, the first three bytes of each data set BLOB may be configured or configurable to indicate the status of that particular data set; e.g., LOADED, INITIALIZED, READY, BLOCKED, REMOVABLE, or DELETED. Subsequent bytes of data may be used to indicate for example, the identity of the issuer, user, transaction/membership account identifier or the like. Each of these condition annotations is further discussed herein.

The data set annotation may also be used for other types of status information as well as various other purposes. For example, the data set annotation may include security information establishing access levels. The access levels may, for example, be configured to permit only certain individuals, levels of employees, companies, or other entities to access data sets, or to permit access to specific data sets based on the transaction, merchant, issuer, user or the like. Furthermore, the security information may restrict/permit only certain actions such as accessing, modifying, and/or deleting data sets. In one example, the data set annotation indicates that only the data set owner or the user are permitted to delete a data set, various identified merchants are permitted to access the data set for reading, and others are altogether excluded from accessing the data set. However, other access restriction parameters may also be used allowing various entities to access a data set with various permission levels as appropriate.

The data, including the header or trailer may be received by a stand-alone interaction device configured to add, delete, modify, or augment the data in accordance with the header or trailer. As such, in one embodiment, the header or trailer is not stored on the transaction device along with the associated issuer-owned data but instead the appropriate action may be taken by providing to the transaction instrument user at the stand-alone device, the appropriate option for the action to be taken. The present invention may contemplate a data storage arrangement wherein the header or trailer, or header or trailer history, of the data is stored on the transaction instrument in relation to the appropriate data.

One skilled in the art will also appreciate that, for security reasons, any databases, systems, devices, servers or other components of the present invention may consist of any combination thereof at a single location or at multiple locations, wherein each database or system includes any of various suitable security features, such as firewalls, access codes, encryption, decryption, compression, decompression, and/or the like.

Using the foregoing system components, the invention may include the following method. Manager Interface 25 may allow any manager to interface with File Services System 5 via web server 20 and applications server 15 (or any other network discussed herein), thereby allowing the manager to insert parameter and/or configuration information or view tracking information. The parameter and configuration information is stored in Parameter and Configuration Management component 62.

In an exemplary embodiment, a user may access the File services system 5 to retrieve a file from Data of Record 50. As used herein, a "file" may include data, executables, programs, applications, messages, or any other information. The user may access the system through either Internet 36, Intranet 38 or any other network discussed herein. File Transfer Applications Server 32 may receive the request (via web server 34 if through the internet 36) and transmit the request to Messaging Infrastructure 10. File Transfer Services 30 may receive the request and File Transfer Agent 39 may direct the request through File Transformation Server 40 to reformat, validate and enrich the data using enterprise logic. In an exemplary embodiment, meta-data may be used that describes how enterprise logic (e.g., the set of business rules) is applied (i.e., for validation, reformatting) and stored in Data of Record 50 accessible through Parameter and Configuration Management component 62. The business rules may be defined using a business rules definitions tool within File Transformation component 40 and then may be stored by Parameter and Configuration Management 62. For example, the workflow rules for a file may be defined within Data of Record 50. Within one of the workflow steps may be a transformation. The business mapping rules may also be stored within Data of Record 50. The workflow component may request this information from Data of Record 50 and then form a request for a file transformation by File Transformation component 40. File Transformation Server 40 may also define a transformation map and apply the map to the file in a similar manner as discussed above. Once File Transformation Server 40 has completed any directed file transformation, the file request may be transmitted to the Centralized File Management Hub 60 via a Messaging Infrastructure 10. Before, during or after Centralized File Management Hub 60 obtains the requested file from Data of Record 50, Centralized File Management Hub 60 may suitably process the request or the file using any one or more of its components, namely Parameter and Configuration Management 62, File Tracking and Monitoring 64, and File Routing and Workflow 66. The manner in which the file is moved or changed and which File Services System component 5 performs the work on a file within File Services System 5 may be dictated by the workflow defined by Parameter and Configuration Management component 62. The file may then be transmitted to the Messaging Infrastructure 10 that allows the File Transfer Services 30 to deliver the requested file.

One skilled in the art may appreciate that the File services system components are not limited to those described herein. The present invention provides a system and method for effectively moving files electronically, in a secure and efficient manner. The present invention describes a comprehensive system that encompasses industry leading, file management and movement software to address the needs of Enterprises. The system is generic and customizable such that a basic outline for file management exists, yet allows the specific needs of the Enterprise to tailor the system. As such, any additional software or hardware components now known or developed in the future that enhances the scope of the described invention, may not act to limit the herein described invention.

The present invention may be described herein in terms of functional block components, screen shots, optional selections and various processing steps. It should be appreciated that such functional blocks may be realized by any number of hardware and/or software components configured to perform the specified functions. For example, the present invention may employ various integrated circuit components, e.g., memory elements, processing elements, logic elements, look-up tables, and the like, which may carry out a variety of functions under the control of one or more microprocessors or other control devices. Similarly, the software elements of the present invention may be implemented with any programming or scripting language such as C, C++, Java, COBOL, assembler, PERL, Visual Basic, SQL Stored Procedures, extensible markup language (XML), with the various algorithms being implemented with any combination of data structures, objects, processes, routines or other programming elements. Further, it should be noted that the present invention may employ any number of conventional techniques for data transmission, signaling, data processing, network control, and the like. Still further, the invention could be used to detect or prevent security issues with a client-side scripting language, such as JavaScript, VBScript or the like. For a basic introduction of cryptography and network security, see any of the following references: (1) "Applied Cryptography: Protocols, Algorithms, And Source Code In C," by Bruce Schneier, published byjohn Wiley & Sons (second edition, 1996); (2) "Java Cryptography," byjonathan Knudson, published by O'Reilly & Associates (1998); (3) "Cryptography & Network Security: Principles & Practice," by William Stallings, published by Prentice Hall; all of which are hereby incorporated by reference.

As will be appreciated by one of ordinary skill in the art, the present invention may be embodied as a method, a data processing system, a device for data processing, and/or a computer program product. Accordingly, the present invention may take the form of an entirely software embodiment, an entirely hardware embodiment, or an embodiment combining aspects of both software and hardware. Furthermore, the present invention may take the form of a computer program product on a computer-readable storage medium having computer-readable program code means embodied in the storage medium. Any suitable computer-readable storage medium may be utilized, including hard disks, CD-ROM, optical storage devices, magnetic storage devices, and/or the like.

The present invention is described herein with reference to screen shots, block diagrams and flowchart illustrations of methods, apparatus (e.g., systems), and computer program products according to various aspects of the invention. It will be understood that each functional block of the block diagrams and the flowchart illustrations, and combinations of functional blocks in the block diagrams and flowchart illustrations, respectively, can be implemented by computer program instructions. These computer program instructions may be loaded onto a general purpose computer, special purpose computer, or other programmable data processing apparatus to produce a machine, such that the instructions that execute on the computer or other programmable data processing apparatus create means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions specified in the flowchart block or blocks.

Accordingly, functional blocks of the block diagrams and flowchart illustrations support combinations of means for performing the specified functions, combinations of steps for performing the specified functions, and program instruction means for performing the specified functions. It will also be understood that each functional block of the block diagrams and flowchart illustrations, and combinations of functional blocks in the block diagrams and flowchart illustrations, can be implemented by either special purpose hardware-based computer systems which perform the specified functions or steps, or suitable combinations of special purpose hardware and computer instructions.

Benefits, other advantages, and solutions to problems have been described herein with regard to specific embodiments. However, the benefits, advantages, solutions to problems, and any element(s) that may cause any benefit, advantage, or solution to occur or become more pronounced are not to be construed as critical, required, or essential features or elements of any or all the claims or the invention. As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus. Further, no element described herein is required for the practice of the invention unless expressly described as "essential" or "critical".

The invention claimed is:

1. A system, comprising:
a network interface communicating with a memory;
said memory communicating with a messaging processor; and
a processor for facilitating movement of electronic files, said processor, when executing a messaging infrastructure component, performs operations comprising:
facilitating, by said processor, workflow management of files through said system;
communicating, by said processor, with a manager interface; and
determining, by said processor and based upon an outcome of a first service for a first file, a second service for said first file, said messaging infrastructure component not providing an entry point for a user into said system, wherein said outcome comprises workflow task information comprising at least one of an event, data related to said event, statistics related to said event, a service parameter associated with said second service and information to perform said second service, and wherein said second service comprises transforming data associated with said first file, wherein said transforming comprises:
applying, by said processor, a transformation map to a file, wherein said transformation map includes at least one of inputs, outputs, and validation rules; and
using enterprise logic to enrich file content and convert a file type to another file type.

2. The system of claim 1, said operations further comprising:
providing a gateway to at least one of store and retrieve configuration information; and
routing a file through a network and provide routing information to file transfer nodes to facilitate at least one of routing and scheduling of a file transfer.

3. The system of claim 1, wherein said transforming is based upon configuration information, which may include at least one of an enterprise's access control to said system, file transfer routing information, file retention information, and communication channel parameter information through a network.

4. The system of claim 1, further comprising a manager interface configured to at least one of receive configuration information and display tracking information.

5. The system of claim 3, further comprising a manager interface configured to at least one of receive configuration information and display tracking information, wherein said configuration information includes at least one of client authentication information, roles defined that indicate which activities a user is authorized to perform, file workflow configuration, and what services will be requested of each component, and wherein said tracking information includes a workflow task outcome.

6. The system of claim 1, said system further comprising:
at least one file transfer agent communicating with a messaging infrastructure;
a file transfer application server communicating with said messaging infrastructure; and
a user interface communicating with a file transfer application server.

7. The system of claim 1, further comprising a user interface, wherein said user interface is configured to access said system via at least one of an intranet and the Internet.

8. The system of claim 1, further comprising a user interface, wherein said user interface communicates with a file transfer applications server.

9. The system of claim 1, said operations further comprising notifying said central file management hub of workflow events.

10. A computer-based method comprising:
facilitating, by a file processing computer, workflow management of files through a system, wherein said files each have file content;
communicating, by said computer, with a manager interface; and
determining, by said computer and based upon an outcome of a first service for a first file, a second service for said first file, said messaging infrastructure component not providing an entry point for a user into said system, wherein said outcome comprises workflow task information comprising at least one of an event, data related to said event, statistics related to said event, a service parameter associated with said second service and information to perform said second service, and wherein said second service transforming, data associated with said first file,
applying, by said computer, a transformation map to a file, wherein said transformation map includes at least one of inputs, outputs, and validation rules; and using enterprise logic to enrich file content and convert a file type to another file type.

11. The method of claim 10, wherein said receiving occurs via at least one of an intranet and the Internet.

12. The method of claim 10, wherein said file converting includes arranging data within said file in at least one of a format that is convenient to a client and a format that is an industry standard of said client.

13. The method of claim 10, said operations further comprising ensuring that data of said file content includes syntactical integrity as received from a client.

14. The method of claim 10, said operations further comprising providing supplemental information in order for data of said file content to be properly processed by a destination system.

15. The method of claim 10, wherein said operations comprise at least one of file converting based upon enterprise logic and file validating based upon enterprise logic, and wherein at least one of said file converting and said validating use at least one of meta-data and business mapping rules to describe how enterprise logic is applied.

16. The method of claim 10, wherein said operations comprise at least one of file converting based upon enterprise logic and file validating based upon enterprise logic, and wherein at least one of said file converting and said validating define enterprise logic using a business rules definitions tool.

17. The method of claim 10, said operations further comprising notifying said centralized file management hub of workflow events.

18. The method of claim 17, wherein said workflow events include at least one of file transfer, file transformation, and processing exceptions.

19. The method of claim 10, said operations further comprising at least one of splitting a file into several files and segmenting a file into messages.

20. A non-transitory computer-readable medium having computer-executable instructions stored thereon that, if executed by a computer for facilitating movement of electronic files, cause said computer to perform operations comprising:

facilitating, by said computer, workflow management of said files through a system;

communicating, by said computer, with a manager interface; and determining, by said computer and based upon an outcome of a first service for a first file, a second service for said first file, said messaging infrastructure component not providing an entry point for a user into said system, wherein said outcome comprises workflow task information comprising at least one of an event, data related to said event, statistics related to said event, a service parameter associated with said second service and information to perform said second service, and wherein said second service comprises at least one of data associated with said first file;

applying, by said computer, a transformation map to a file, wherein said transformation map includes at least one of inputs, outputs, and validation rules; and using enterprise logic to enrich file content and convert a file type to another file type.

* * * * *